(12) United States Patent
De Angeli (10) Patent No.: US 10,775,205 B2
(45) Date of Patent: Sep. 15, 2020

(54) SENSOR TUNABLE OFFSET REMOVAL CIRCUIT IN PASSIVE TAGS

(71) Applicant: Marco De Angeli, Barzana (IT)

(72) Inventor: Marco De Angeli, Barzana (IT)

(73) Assignee: FLEX, LTD., Singapore (SG)

( * ) Notice: Subject to any disclaimer, the term of this patent is extended or adjusted under 35 U.S.C. 154(b) by 311 days.

(21) Appl. No.: 15/908,404

(22) Filed: Feb. 28, 2018

(65) Prior Publication Data

US 2019/0265078 A1    Aug. 29, 2019

(51) Int. Cl.
| | | |
|---|---|---|
| *G01D 7/00* | (2006.01) | |
| *G01D 5/00* | (2006.01) | |
| *H02N 99/00* | (2006.01) | |
| *G01D 21/00* | (2006.01) | |
| *G06K 19/07* | (2006.01) | |

(52) U.S. Cl.
CPC ............ *G01D 7/00* (2013.01); *G01D 5/00* (2013.01); *G06K 19/0723* (2013.01); *H02N 99/00* (2013.01)

(58) Field of Classification Search
None
See application file for complete search history.

(56) References Cited

U.S. PATENT DOCUMENTS

| | | | | |
|---|---|---|---|---|
| 6,249,212 B1* | 6/2001 | Beigel | ............... | G06K 7/10297 340/10.34 |
| 2003/0057930 A1* | 3/2003 | Kison | .................... | G01D 21/00 323/299 |
| 2015/0256082 A1* | 9/2015 | Gudan | .................... | H02J 7/025 320/108 |

OTHER PUBLICATIONS

Anabtawi et al., "A Fully Implantable, NFC Enabled, Continuous Interstitial Glucose Monitor" 2016 IEEE-EMBS International Conference on Biomedical and Health Informatics (BHI), Las Vegas, NV, 2016, pp. 612-615 (Year: 2016).*

* cited by examiner

*Primary Examiner* — John C Kuan
(74) *Attorney, Agent, or Firm* — Volpe and Koenig, P.C.

(57) ABSTRACT

Described herein is a method for and a device configured to generate an energy amount via a received magnetic field. A sensor may be configured to generate an output voltage based on a sensor reading by using a portion of the energy amount and a diode biased in its active region via a resistor may generate an operating voltage to shift the output voltage into a positive region. The resistor may be configured to modify an operating voltage of the diode by using a portion of the energy amount. An analog to digital converter may be configured to receive a combined voltage or to combine received voltages to convert a combined voltage such that a combined voltage is the output voltage shifted by or added to the operating voltage. A transmitter may transmit a sensor output based on the combined voltage by using a portion of the energy amount.

18 Claims, 6 Drawing Sheets

SENSOR TUNABLE OFFSET REMOVAL CIRCUIT IN PASSIVE TAGS

BACKGROUND

Sensors in passive energy harvesting tags may be used to sense characteristics or gather data. An analog to digital converter may be integrated with the tag to convert analog data obtained from a sensor to digital data to be provided to a component that may utilize the sensor data.

The output voltage provided by a sensor may be not be suitable as an input to an analog to digital converter as the output voltage may contain a negative voltage portion due to a sensor's output range.

SUMMARY

In an aspect, the invention relates to a device with an energy-harvesting component configured to generate an energy amount via a received magnetic field. A sensor may be configured to generate an output voltage based on a sensor reading and a diode biased in its active region via a resistor may be provided. The resistor may be configured to modify an operating voltage of the diode by using a portion of the energy amount. An analog to digital converter may be configured to receive a combined voltage, or to combine received voltages, to convert a combined voltage such that a combined voltage is the output voltage shifted by or added to the operating voltage. A transmitter may be configured to transmit a sensor output based on the combined voltage, by using a portion of the energy amount.

In an aspect, the invention relates to a method for generating an energy amount via a magnetic field and generating an output voltage via a sensor based on a sensor reading. The method includes biasing a diode in its active region via a resistor and modifying an operating voltage of the diode via the resistor by using a portion of the energy amount. The method further includes receiving a combined voltage, or combining received voltages, at an analog to digital converter such that the combined voltage is the output voltage added to the operating voltage and transmitting a sensor output via a transmitter by using a portion of the energy amount, such that the sensor output is based on the combined voltage.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Examples of different sensor and circuit configuration implementations will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

A passive energy harvesting tag or chip, such as the Near Field Communication (NFC) tag disclosed herein, may be implemented using a single die solution and with a digital core, a temperature sensor and a radio frequency (RF) component with the energy harvesting capabilities. A sensor contained within or attached to a tag may be in connection with an analog to digital converter. The output voltage of the sensor may contain a negative component and if the sensor and the analog to digital converter share the same ground level. However, the analog to digital converter may not be able to convert the negative voltage portion of the sensor's output range. Accordingly, an operating voltage is disclosed herein such that the operating voltage enables the analog to digital converter to convert a voltage in its positive or otherwise convertible range.

Figure 1:
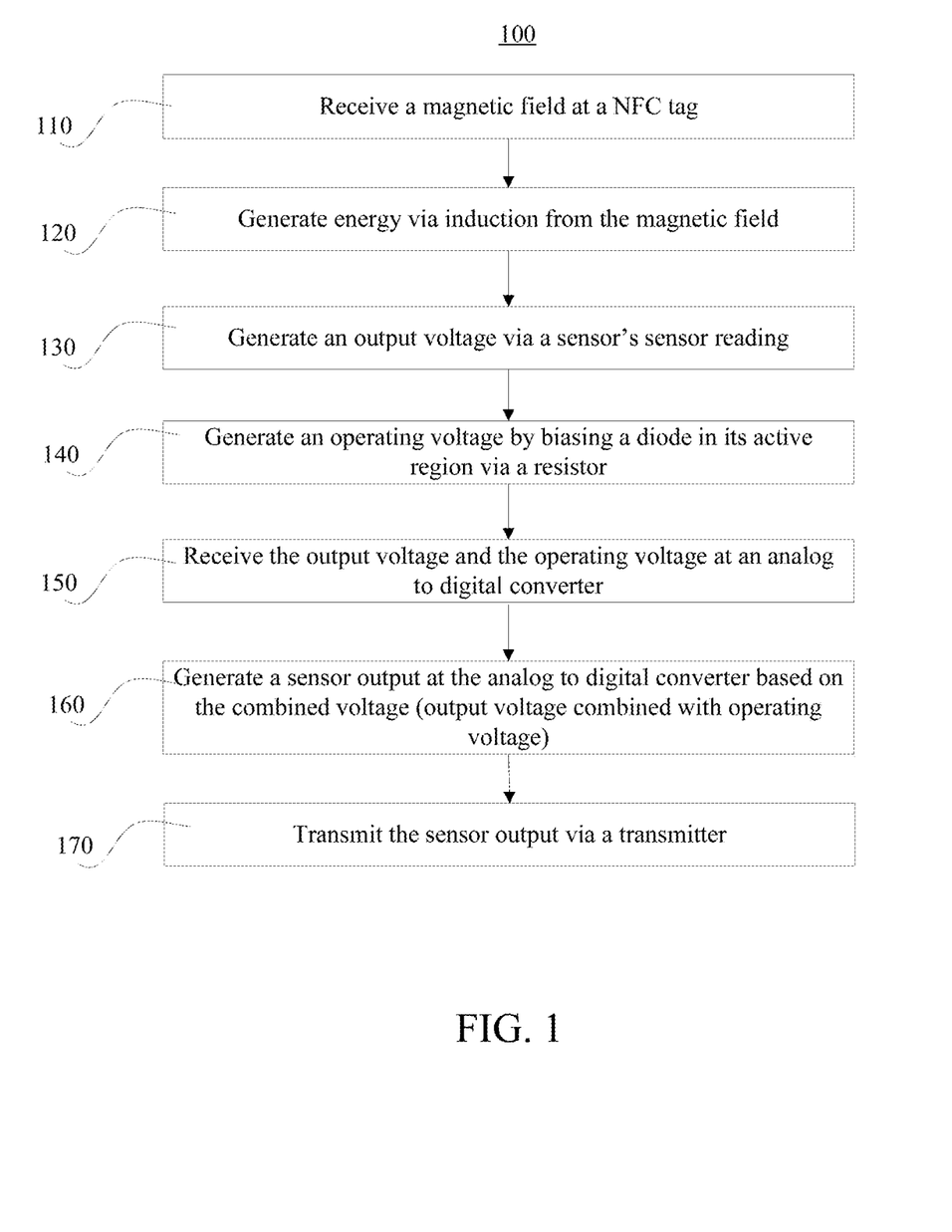
FIG. 1 is a method for transmitting a sensor output via a transmitter.

FIG. 1 shows a method 100 to transmit data collected via one or more sensors by adding an operative voltage such that an analog to digital converter operates in a positive range. At step 110 a magnetic field may be received at a Near Field Communication (NFC) tag. As further discussed herein, a magnetic field may be provided by any magnetic field transmitting device configured to transmit a magnetic field such as, for example, a mobile phone or a standalone device. The magnetic field may be transferred as a result of the magnetic field transmitting device being proximal to the NFC tag. As further discussed herein, an NFC tag may be any applicable tag configured to generate energy and activate based on receiving a field such as a magnetic field. At step 120, energy may be generated at the NFC tag via induction from the magnetic field. As further discussed herein, the energy may be generated via the interaction of the magnetic field with coils contained in the NFC tag. At step 130, a sensor may generate an output voltage based on a sensor reading. As further disclosed herein, the output voltage based on the sensor reading may be based on, for example, electrochemical reactions.

At step 140, an operating voltage may be generated by biasing a diode in its active region by using a resistor configured to control the operating voltage. The operating voltage may be a voltage that enables a combined voltage to be in the positive range such that the combined voltage is the combination of the operating voltage and the output voltage. At step 150, an analog to digital converter may receive the output voltage and the operating voltage. The output voltage and the operating voltage may be combined to generate the combined voltage prior to being received by the analog to digital converter, such as by the operating voltage acting as a ground for a sensor, as further disclosed herein, or may be combined at the analog to digital converter.

At step 160, a sensor output is generated at the analog to digital converter based on the combined voltage. The sensor output may be the combined analog voltage converted to a digital output by the analog to digital converter and may represent the sensor reading. At step 170, the sensor output may be transmitted by a transmitter such as via an antenna attached to or part of the NFC tag.

Figure 2A:
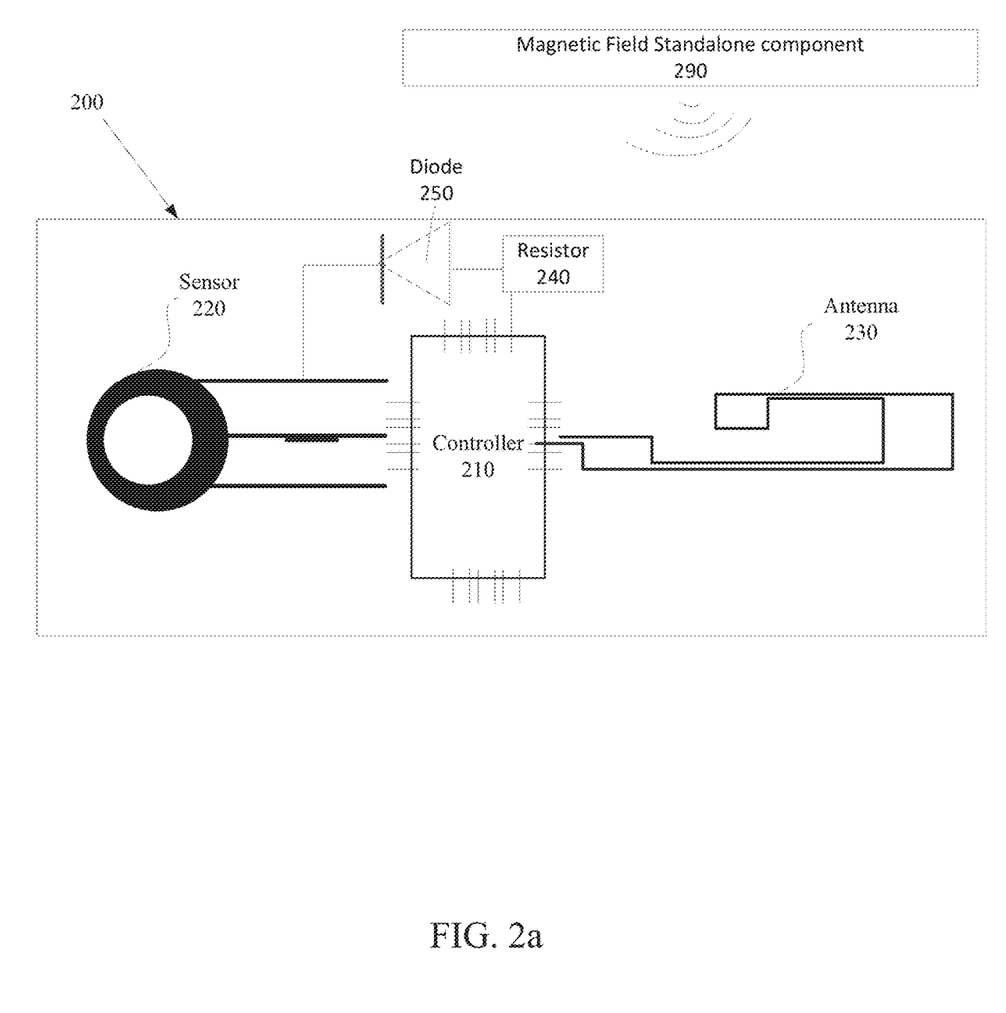
FIG. 2a is diagram of an NFC tag with a diode and resistor.

At step 110 of method 100 in FIG. 1, a magnetic field may be received at an NFC tag. It will be understood that although an NFC tag is specifically disclosed herein, an NFC tag may refer to any near field communication component such as, for example, a Radio Frequency Identification component. The magnetic field may be generated via any applicable device such as a standalone component configured to provide such magnetic fields proximal to the NFC tag, a mobile device such as a cellular phone or standalone device which is proximal to the NFC tag, or the like. The magnetic field may induce a current within the NFC tag via, for example, a set of coils contained within the NFC tag. FIG. 2a shows an example diagram of a configuration disclosed herein and includes an NFC tag 200. A standalone component 290, as shown in FIG. 2a, may generate a magnetic field proximal to the NFC tag 200. The magnetic field may be received at coils contained in an antenna 230 of NFC tag 200 such that the coils are used to convert the magnetic field into induced current.

Figure 2B:
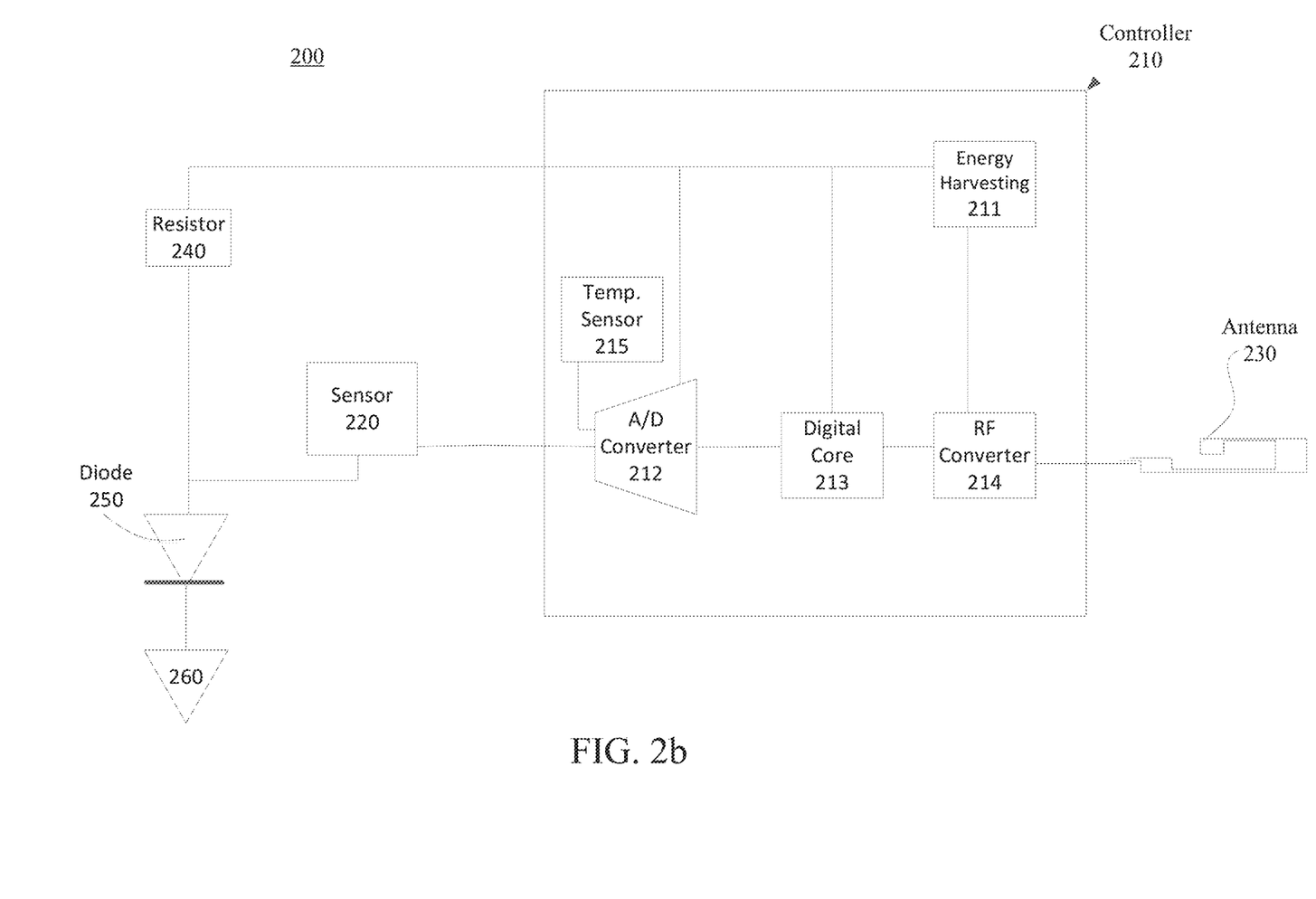
FIG. 2b is a diagram of an NFC tag with a diode and resistor and controller.

At step 120 of method 100 in FIG. 1, the induced current may provide energy to be used by the components of the NFC tag such as by a sensor 220, diode 250, resistor 240, and controller 210 as shown in FIGS. 2a and 2b. The harvested energy may be stored in an energy harvesting component 211 as shown in FIG. 2b. The energy harvesting component may allow a given amount of energy to be stored for operation of the NFC tag and related components. The energy may be stored for a temporary amount of time, such as during a sensing cycle where a sensor output is generated and transmitted to an external device. Alternatively, the energy may be stored until the energy is used up by the NFC tag and related components. As shown in FIG. 2b the energy harvesting component 211 may be in connection with components within and external to the controller 210. The energy harvesting component 211 may provide energy to activate or utilize the components both internal to controller 210, such as the analog to digital converter 212, and external to the controller 210, such as the sensor 220.

Figure 3:
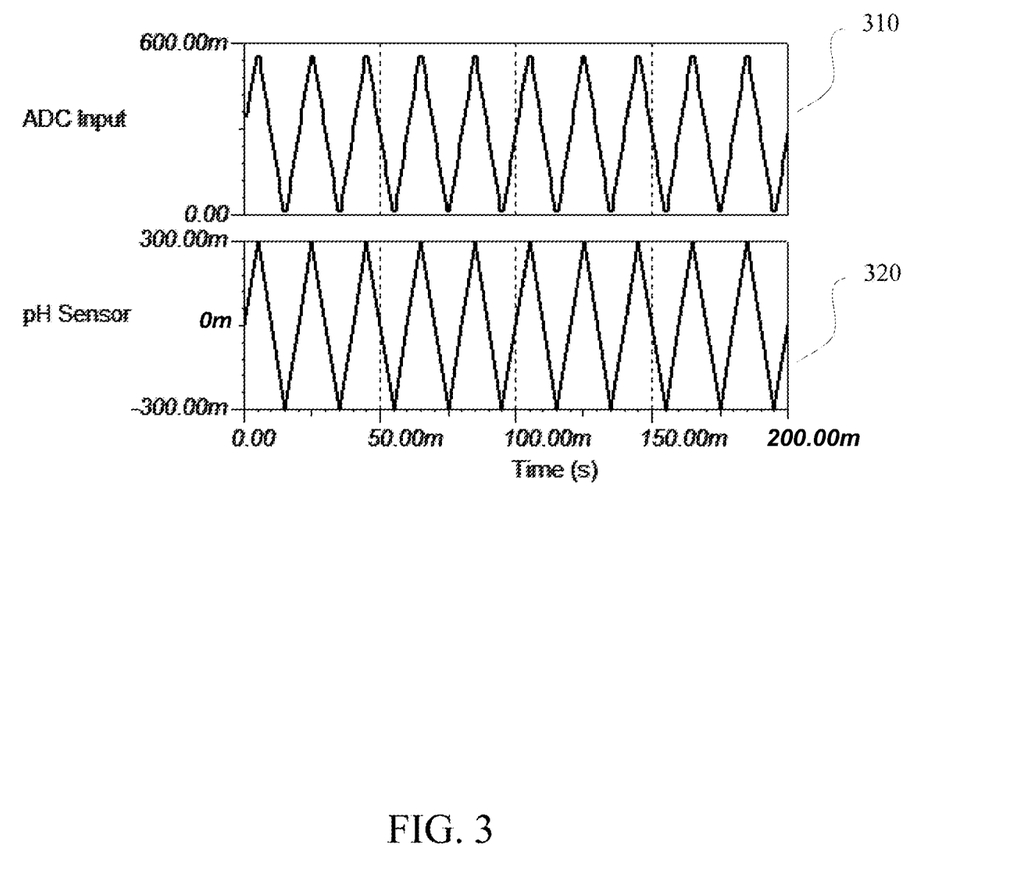
FIG. 3 is a diagram of a sensor output and an analog to digital converter input.

At step 130 of method 100 in FIG. 1, an output voltage may be generated based on a sensor's sensor reading. A sensor may be any sensing device configured to provide an output based on an input such as an electrochemical input, a physical input, a visual input, a location-based input, a time-based input, or the like. An electrochemical input may be, for example, a pH level, an ion type or amount, a biological type or amount, or any input corresponding to chemical or biological characteristics. A physical input may be temperature, humidity, a condensation level, a material, friction, or any input corresponding to a tangible or molecular characteristic. A visual input may be, for example, a wavelength, a photon, a color, a hue, a luminescence, or the like. A location-based input may be, for example, a physical location, acceleration, velocity, distance, or the like. A time-based input may be, for example, duration, temporal relativity, or the like. The output of a sensor may be an output voltage and may be in the form of a wave or other periodic output such as, for example, a sinusoidal output. FIG. 3 shows an example output voltage 320 generated by a pH sensor. As shown, the output voltage 320 may fluctuate between 300.00 m and −300.00 m. Notably, the output voltage generated based on a sensor reading may contain a negative component without applying the operating voltage as further discussed herein. As shown in FIG. 3, the periodic output voltage 320 produced by pH sensor contains a negative component represented by the voltage that is below the 0 value on the y-axis.

As stated herein, an analog to digital converter may not be capable of converting negative voltage values and, accordingly, if the output voltage 320 of FIG. 3 is input into such an analog to digital converter, the analog to digital converter may not convert the values that are below the 0 value on the y-axis.

At step 140 of method 100 in FIG. 1, an operating voltage may be generated by biasing a diode in its active region and using a resistor such that combining such an operating voltage with the output voltage of the sensor results in a combined voltage with only positive voltage values.

According to an implementation of the disclosed subject matter, an operating voltage generated by a diode in connection with the resistor may be a voltage reference such that the diode produces such a constant operating voltage regardless of the load on the diode. According to this implementation, the operating voltage functions as a relative ground point for the sensor and results in a shift to the sensor's output voltage to provide a combined voltage such that the combined voltage output from the sensor is the fixed operating voltage of step 140 plus the output voltage generated by the sensor based on the sensor reading, at step 130.

The resistance value of a resistor may determine the operating voltage such that an increase or decrease in the resistance value may result in an increase or decrease in the operating voltage. The resistor and/or diode may be configured based on the type or configuration of a sensor, which generates an output voltage. The type of sensor used may determine the corresponding resistance value and/or resistor required to obtain an applicable amount of operating voltage such that no negative voltage is converted by an analog to digital converter.

At step 150 of FIG. 1, the analog to digital converter may receive the output voltage and the operating voltage. As an example, the analog to digital converter may receive a analog voltage that is the output voltage generated by the sensor in step 130 of FIG. 1 offset by the operating voltage of step 140 such that the input to the analog to digital converter is the combination of the output and operating voltages. As a visual example, the input received at the analog to digital converter may be the ADC input 310 of FIG. 3 such that the lower threshold of the voltage received at the analog to digital converter is 0. As another example, the analog to digital converter may receive the output voltage generated by the sensor, such as the voltage ranging from −300.00 m to 300.00 m as shown by 320 in FIG. 3 as well as an operating voltage generated via a diode. The output voltage and the operating voltage may be combined at the analog to digital converter itself, such that the analog input for conversion becomes, for example, the ADC input 310 of FIG. 3, which ranges from 0 to 600.00 m.

At step 160 of FIG. 1, the analog to digital converter may convert the analog input received in step 150 into a digital sensor output. The digital sensor output may correspond to the full range of sensor readings generated by the sensor at step 130 such that both negative and positive components of the sensor reading are incorporated in the sensor output at step 150. The sensor output generated at step 160 may be provided to a transmission component such as an antenna 230 as shown in FIGS. 2a and 2b. The sensor output may then be transmitted by a transmission component, at step 170. The energy generated at step 120 of FIG. 1 may be used to facilitate the transmission via a transmitter, such as antenna 230 of FIGS. 2a and 2b. According to an implementation of the disclosed subject matter, a digital core, such as the digital core 213 shown in FIG. 2b, may receive the digital output from the analog to digital converter and may store the output and/or manipulate the output prior to the output being transmitted via a transmitter.

According to an implementation of the disclosed subject matter, an NFC tag may contain a temperature sensor. The temperature sensor may provide a temperature value corresponding to the temperature of the NFC tag or a component of or around the NFC tag. The temperature value may cause drifts on the diode's voltage and may be used to compensate for such drifts. Notably, the operating voltage provided by a diode may drift based on the temperature of the diode and/or the ambient temperature. Accordingly, the temperature value provided by the temperature sensor may allow a component, such as the analog to voltage converter, to compensate for the drift caused by the temperature, by using the temperature value. The compensation for the drift may be a linear or non-linear compensation such that an X amount of temperature increase or decrease may require an X amount of voltage adjustment or, alternatively, an X amount of temperature increase or decrease may require a Y amount of voltage adjustment where Y is determined based on a formula.

As an example, the temperature sensor 215 in FIG. 2b may be used to provide a temperature value to the analog to digital converter 212. The analog to digital converter 212 may use the temperature value provided by temperature sensor 215 to effectively increase or decrease the operating voltage output by the diode 250 that is connected in series to resistor 240 and ground 260.

According to an implementation of the disclosed subject matter, the temperature sensor may provide a temperature value to the diode, resistor, or sensor such that the operating voltage is modified based on the temperature value to compensate for the fluctuation in operating voltage caused by the corresponding temperature. As an example, the temperature sensor 215 in FIG. 2b may be used to provide a temperature value to the sensor 220. The sensor 220 may use the temperature value provided by temperature sensor 215 to effectively increase or decrease the operating voltage output by the diode 250 that is connected in series to resistor 240 and ground 260.

According to an implementation of the disclosed subject matter, the temperature sensor may provide a temperature value to a sensor such that an output voltage is modified based on the temperature value to compensate for the drift in operating voltage caused by the corresponding temperature. As an example, the temperature sensor 215 in FIG. 2b may be used to provide a temperature value to the sensor 220. The sensor 220 may use the temperature value provided by temperature sensor 215 to effectively increase or decrease the output voltage such that increase or decrease in the output voltage corresponds to compensating for a drift in the operating voltage due to the temperature.

FIGS. 2a and 2b show an example diagram and circuit to implement the techniques disclosed herein. It will be understood that any other applicable configuration and circuit may be used such that the configuration and circuit shown in FIGS. 2a and 2b are shown only as potential examples. An NFC tag 200 may contain an antenna 230 which may receive a magnetic field and may generate energy via conduction using the magnetic field. The energy may be stored within NFC tag 200's controller 210 at an energy-harvesting component 211 such that the energy-harvesting component 211 provides energy to the various components of the NFC tag 200 to facilitate their respective functions. The energy-harvesting component 211 may provide energy to a sensor 220 and may also provide energy to resistor 240 and diode 250 to enable a fixed reference operating voltage as a relative ground point for the sensor 220. An output voltage generated by the sensor 220 and shifted using an operating voltage drawn by resistor 240 and diode 250 may be provided to an analog to digital converter 212. The analog to digital converter 212 may also receive a temperature value from temperature sensor 215. The analog to digital converter 212 may modify a combined voltage input into the analog to digital converter 212 based on the temperature value and may convert the modified combined voltage to generate a digital sensor output provided to digital core 213. Digital core 213 may receive the digital sensor output from the analog to digital converter 212 and may, via RF converter 214, store the digital sensor output and/or, via RF convertor 214, manipulate the digital sensor output prior to the digital sensor output's transmission via a transmitter, such as antenna 230.

Figure 4:
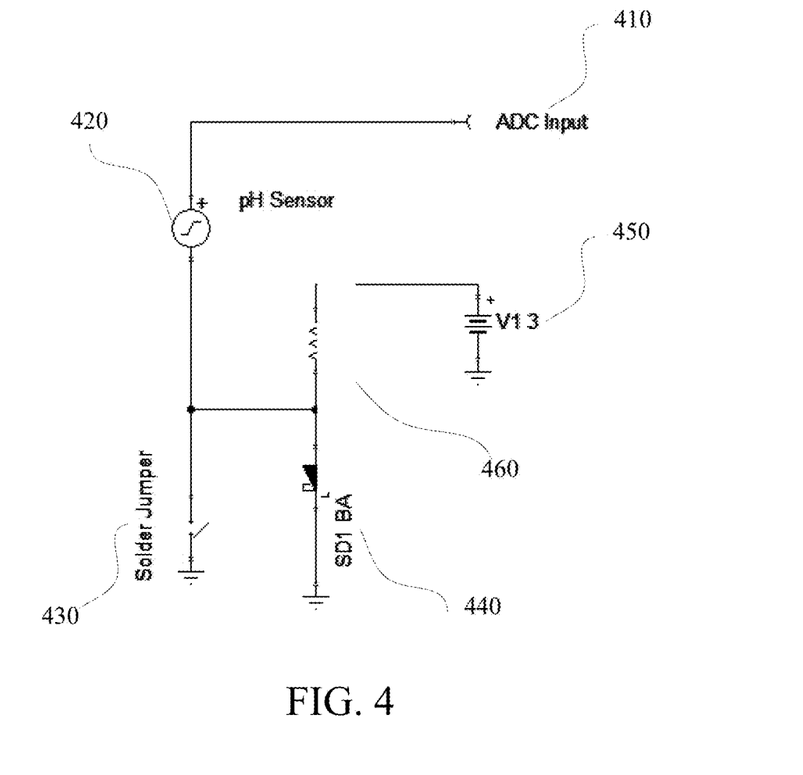
FIG. 4 is a circuit diagram of a pH sensor in connection with a resistor and diode.

FIG. 4 shows an example circuit diagram of the components disclosed herein. As shown, a pH sensor 420 may be grounded, via a solder jumper 430, to the same ground as a RS30k resistor 460 and SD1 BAS70 diode 440 such that the resistor 460 and diode 440 create a reference operating voltage as a relative ground point for the pH sensor 420, to generate a shift of pH sensor's 420 output and match the ADC input 410 range. The voltage source 450 may be powered using energy contained in an energy-harvesting component and may be generated via a magnetic field. Notably, the resistor 460 and diode 440 may create a reference operating voltage to shift any negative components of the output voltage generated by pH sensor 420 into a positive range, as disclosed herein.

Figure 5:
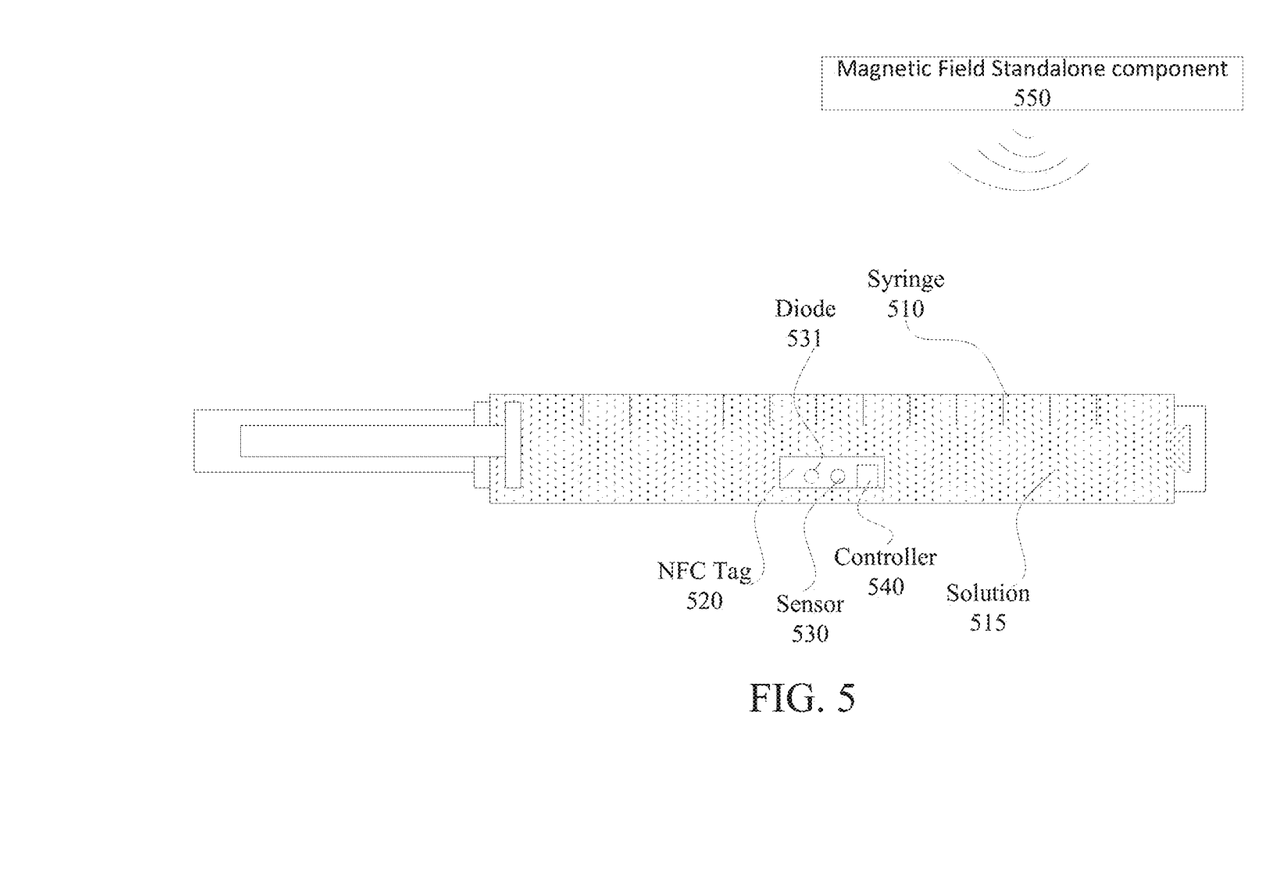
FIG. 5 is a diagram of a NFC tag with a pH sensor, attached to a syringe.

FIG. 5 shows an example implementation of the subject matter disclosed herein. A syringe 510 that contains a solution 515 may include an NFC tag 520. The NFC tag 520 may be affixed to the surface of the syringe 510 via any applicable technique such as, for example, via an adhesive. The NFC tag 520 may receive a magnetic field provided by a standalone component 550 and may generate energy using the received magnetic field. A sensor 530 on NFC tag 520 may generate an output voltage based on a sensor value such as a pH reading. As a non-limiting example, the sensor may be configured such that a higher pH reading may result in a higher voltage and vice versa. Notably, the output voltage provided by the sensor may be periodic and may contain wave characteristics. The output voltage may be shifted by an amount equal to a fixed operating voltage generated as a result of a diode 531 that shares a ground with the sensor 530. The shifted output voltage may be provided to a controller 540 that contains an analog to digital converter. The analog to digital converter may receive the shifted output voltage and provide a digital sensor output, which may be transmitted by the NFC tag 520.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A device comprising:
   a component configured to generate an energy amount via a received magnetic field;
   a sensor configured to generate an output voltage based on a sensor reading;
   a diode biased in its active region via a resistor;
   the resistor configured to modify an operating voltage of the diode by using a portion of the energy amount;
   an analog to digital converter configured to receive a combined voltage wherein the combined voltage is the output voltage added to the operating voltage and further configured to output a sensor output based on the combined voltage; and
   a transmitter configured to transmit the sensor output based on the combined voltage by using a portion of the energy amount.

2. The device of claim 1, wherein the sensor is configured to receive one of an electrochemical input, a physical input, a visual input, a location-based input, and a time-based input.

3. The device of claim 1, further comprising a temperature sensor configured to obtain a temperature value.

4. The device of claim 3, wherein the combined voltage is modified based on the temperature value.

5. The device of claim 3, wherein the operating voltage is modified based on the temperature value.

6. The device of claim 3, wherein the output voltage is modified based on the temperature value.

7. The device of claim 1, wherein the resistor is configured to modify the operating voltage of the diode based on a sensor type associated with the sensor.

8. The device of claim 1, wherein the diode consumes approximately 1 micro amp of energy per sensor reading.

9. The device of claim 1, further comprising a coil configured to receive the received magnetic field.

10. A method comprising:
    generating an energy amount via a received magnetic field;
    generate an output voltage based on a sensor reading, provided by a sensor, by using a portion of the energy amount;
    biasing a diode in its active region by using a resistor with a resistor value wherein an operating voltage is determined by the resistor value;
    providing a combined voltage to an analog to digital converter wherein the combined voltage is the output voltage added to the operating voltage;
    outputting a sensor output based on the combined voltage using a portion of the energy amount; and
    transmitting the sensor output using a portion of the energy amount.

11. The method of claim 10, wherein the sensor is configured to receive one of an electrochemical input, a physical input, a visual input, a location-based input, and a time-based input.

12. The method of claim 10, further comprising obtaining a temperature value via a temperature sensor.

13. The method of claim 12, wherein the combined voltage is modified based on the temperature value.

14. The method of claim 12, wherein the operating voltage is modified based on the temperature value.

15. The method of claim 12, wherein the output voltage is modified based on the temperature value.

16. The method of claim 10, wherein the resistor is configured to modify the operating voltage of the diode based on a sensor type associated with the sensor.

17. The method of claim 10, wherein the diode consumes approximately 1 micro amp of energy per sensor reading.

18. The method of claim 10, further comprising a coil configured to receive the received magnetic field.

* * * * *